United States Patent [19]

Martel et al.

[11] 4,166,208
[45] Aug. 28, 1979

[54] CORN POPPER WITH BUTTER DISPENSER

[75] Inventors: Thomas J. Martel, North Reading; George Freedman, Wayland; Robert F. Bowen, Burlington; Wesley W. Teich, Wayland, all of Mass.

[73] Assignee: Raytheon Company, Lexington, Mass.

[21] Appl. No.: 890,094

[22] Filed: Mar. 27, 1978

[51] Int. Cl.² ............................................. H05B 9/06
[52] U.S. Cl. .......................... 219/10.55 E; 99/323.5; 99/323.8; 426/243
[58] Field of Search ................. 219/10.55 E, 10.55 R, 219/10.55 F, 432; 99/323.4, 323.5, 323.8, 345, 347; 426/107, 113, 241, 243, 449

[56] References Cited

U.S. PATENT DOCUMENTS

| 2,939,379 | 6/1960 | Schmitt | 99/323.8 |
| 3,722,399 | 3/1973 | Cole | 99/323.8 |
| 3,847,067 | 11/1974 | Munsey | 99/323.8 |
| 4,013,798 | 3/1977 | Goltsos | 219/10.55 E X |

Primary Examiner—Arthur T. Grimley
Attorney, Agent, or Firm—Harold A. Murphy; Joseph D. Pannone; John T. Meaney

[57] ABSTRACT

A microwave corn popper having means for dispensing butter during or shortly subsequent to the corn popping process, and comprising a chamber containing the corn kernels to be popped and having a cover with a recess in which is disposed a butter container, whereby the butter in the container is heated by the same microwave source as the kernels and consequently is melted during the popping process.

7 Claims, 6 Drawing Figures

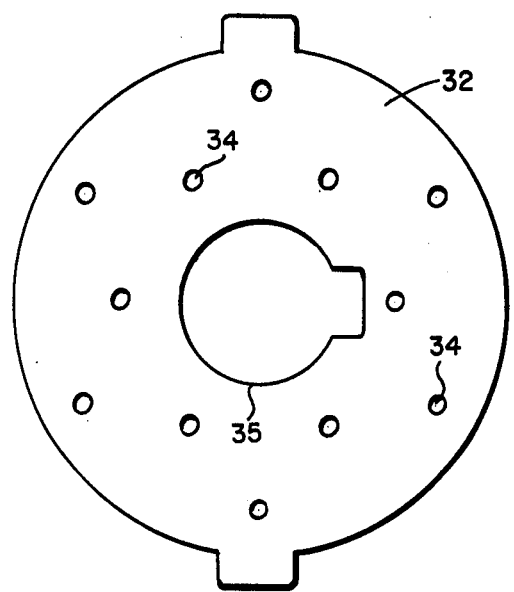
FIG. 3
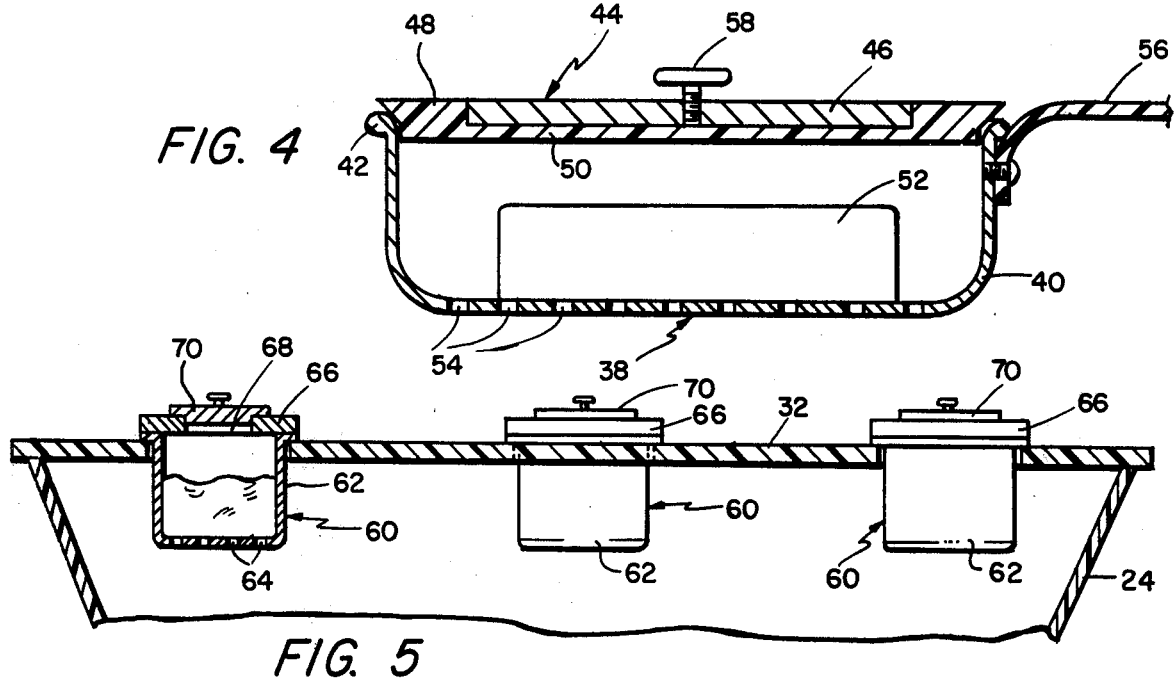
FIG. 4
FIG. 5
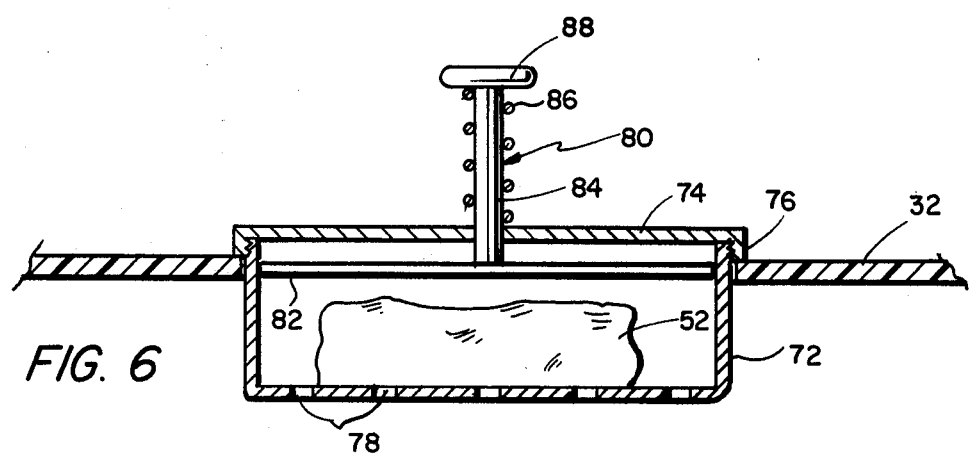
FIG. 6

CORN POPPER WITH BUTTER DISPENSER

BACKGROUND OF THE INVENTION

Popcorn is made by heating popcorn kernels, causing them to explode, as is well known. There are many varieties of corn poppers which are adapted to contain unpopped kernels which may be subjected to heat from any suitable source for the popcorn making process.

In the prior art it has been shown that heat may be applied to the kernels by radiation, convection or conduction in conventional devices, and in the most modern appliances by the application of microwave energy. Conventional devices are, of course, fueled by electrical energy or by the burning of liquid or gaseous fuel.

Popcorn has been made in many ways. Kernels have been placed in a screenlike container with a long handle so that the container may be held suspended above an open flame. Since the heat from the flame usually radiates onto or contacts only one side of the supply of kernels, it is necessary to vigorously shake the container so that all the kernels will be heated and to prevent burning of the popped corn. Another method is to place a supply of kernels in a covered pan disposed on a burner of a kitchen range, for example, and again shake the pan to properly heat all the kernels and agitate the popped corn. Still another method is to place the kernels in an enclosure having wall areas containing electrical heating elements. This method again usually requires that the enclosure be at least slightly agitated. In all of these methods, butter and salt usually must be subsequently added.

It is also known that a partially collapsed sealed foil-like disposable container may be provided with a supply of kernels and oil and agitated over a source of heat whereupon the kernels will pop, causing the container to expand, following which the container may be ruptured to remove the popcorn which will be at least partially covered with the oil. In a still further known method, a partially collapsed, sealed, plastic bag of kernels, with or without oil, is placed in a microwave oven. Microwave radiation is then directed through the oven to the kernels, causing them to pop. Agitation in such a case is not necessary since microwave radiation will easily contact each kernel. A suitable oil may also be provided in this type of device.

It has been found that butter can not be used satisfactorily with the packaged systems because butter can become rancid after a period of time such as might occur when the packages are stored or on store shelves for a lengthy period. Oils which may be used as substitutes for butter usually have a different and sometimes undesirable taste.

An improved corn popping appliance is described in two U.S. patent applications, Ser. No. 865,824, Bowen et al, filed Dec. 30, 1977, and Ser. No. 866,081, Teich et al, filed Dec. 30, 1977, both of which are assigned to the same assignee as the present invention. This appliance is especially adapted to utilize microwave energy as the heat source and preferably comprises a bowl or container of microwave-transparent material which is substantially conical in shape so that kernels may be retained in a clump in the small end of the container. The container is supported with its small end within a comating cavity formed in an encircling microwave concentrator. Upon subjection of the device to microwave radiation, such as in a microwave oven, the kernels will become heated directly by the microwave radiation and by heat generated by the concentrator and, as a consequence, will expand or explode. Such exploding kernels will be propelled upwardly into the wider portion of the container while unpopped kernels will continue to be retained clumped in the small end of the container for eventual popping. In this microwave appliance no means has been disclosed for adding butter to the produced popcorn.

SUMMARY OF THE INVENTION

In accordance with the present invention, means is provided for heating and melting butter simultaneously with the corn popping process, and for application of the melted butter either simultaneously with the popping process or subsequent thereto if desired. The present invention is particularly adapted to the microwave corn popper described in the aforementioned U.S. patent applications.

A popper according to this invention comprises a bowl or container which is provided with a lid or cover. The cover is provided with at least one aperture which is shaped to receive a butter dispenser. The container and the cover are made of microwave transparent material so that microwave energy may easily penetrate into the interior of the container and contact the clump of popcorn kernels in the bottom of the container. The concentrator which supports the container also functions to concentrate microwaves upon the clump of kernels which it surrounds, further aiding the popping process.

The butter dispenser, however, is constructed of a combination of microwave-transparent and nontransparent materials. It is shaped in the form of a small metal pot having a handle attached to one side. The top of the small pot is closed by a cover which comprises a metal disc of a diametric size which is smaller than the diameter of the top of the pot. However, the metal cover is provided with a peripheral ringlike marginal portion of microwave-transparent material which has an outer diameter of a size which enables the cover to properly fit upon and close the pot.

The metal pot and disc will function to intercept and prevent portions of the microwave energy from passing into the interior of the pot. However, some microwave radiation will pass into the pot through the microwave-transparent marginal portion of the cover and thus will directly contact and melt a supply of butter which is disposed in the pot. Also the metal parts of the device will also be heated by the microwave energy and the resulting heat will also contribute to the melting of the butter. Furthermore, when kernels are being popped, significant heat and vapor are generated and rise to the area of the dispenser to further contribute to the heating and resultant melting of the butter.

Therefore, in accordance with this invention, the amounts of heat contributed by the heat and vapor rising from the popped corn, by the heating of the pot and cover, and by the direct impingement of microwaves upon the butter, are all controlled so as to provide complete melting of the butter at the proper time.

The use of a removable or adjustable portion of the metal cover or enlargement of the transparent marginal portion of the cover can be coupled with the heating of the butter by heat from the pot caused by engagement therewith of microwaves and vapor from the popped corn to cause the butter to be melted approximately at the end of a popping cycle. Then the melted butter will flow out through small openings in the bottom of the dispenser pot onto the popcorn in the container.

Variations in the butter melting cycle may be achieved as well by other methods of reducing or increasing the microwave energy shielding so that butter and margarine, which generally have different melting temperatures, may be used. One or several such butter dispensers may be used with a single appliance and may be adapted to automatically drip onto the popcorn or to be subsequently poured thereon. Also, means may be provided for physically ejecting the butter from the dispenser if desired.

BRIEF DESCRIPTION OF THE DRAWINGS

The above and other advantages and objectives of this invention will become apparent from the following description taken in connection with the accompanying drawings, wherein:

FIG. 3 is a plan view of the popcorn maker cover;

FIG. 4 is a vertical sectional view through a butter dispenser of a preferred form;

FIG. 5 is a vertical sectional view of the top portion of a popcorn maker container and cover showing a plurality of butter dispensers of modified type in accordance with this invention; and FIG. 6 is a vertical sectional view of a further embodiment of the butter dispenser in accordance with this invention.

DESCRIPTION OF THE PREFERRED EMBODIMENTS

Figure 1:
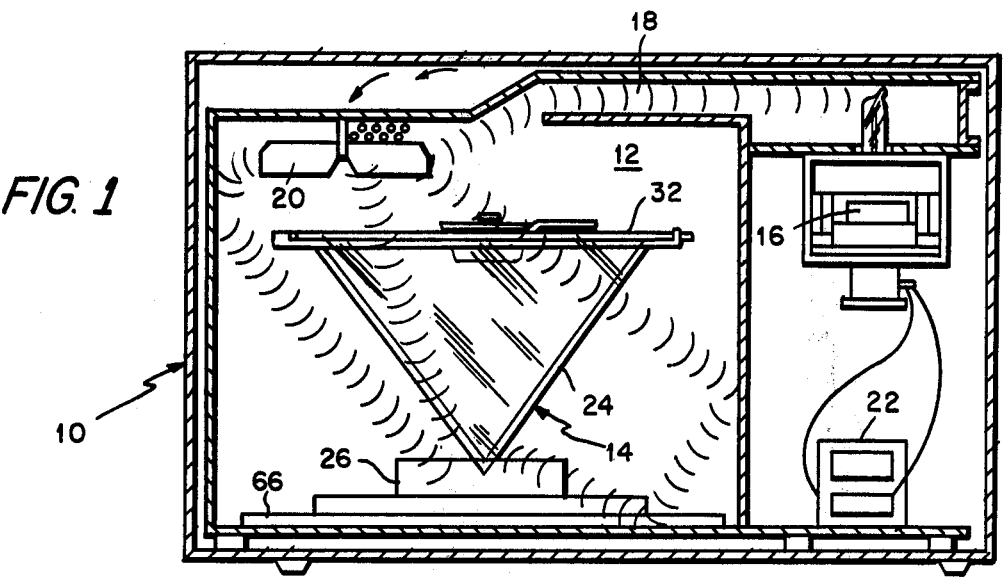
FIG. 1 is a vertical sectional view of a microwave oven showing a popcorn maker with butter dispenser embodying the invention located within the oven cavity.

Referring more particularly to the drawings wherein like characters of reference designate like parts throughout the several views, there is shown in FIG. 1 a microwave oven 10 including an oven cavity 12 having a popcorn maker 14 which may be positioned therein through a door (not shown). The oven cavity is supplied with microwave energy from a magnetron 16 via a waveguide 18. While the magnetron 16 may generate energy of any desired frequency, a frequency of about 2.45 KMH is particularly suitable. The oven cavity 12 has internal dimensions which are many times the free space wavelength of said frequency so that many different resonant modes may be produced therein and such modes may be cyclically distributed by a mode stirrer 20.

The cathode of magnetron 16 is supplied with filament heater power and anode voltage power at a voltage of, for example, 4000 volts from a high voltage power supply 22 by suitable wiring while the anode of the magnetron 16 is grounded.

It is believed that this provides sufficient description of the microwave oven 10 and for more information reference may be made to any existing patents or to copending application Ser. No. 671,469, filed by McConnell et al and assigned to Amana Refrigeration, Inc.

Figure 2:
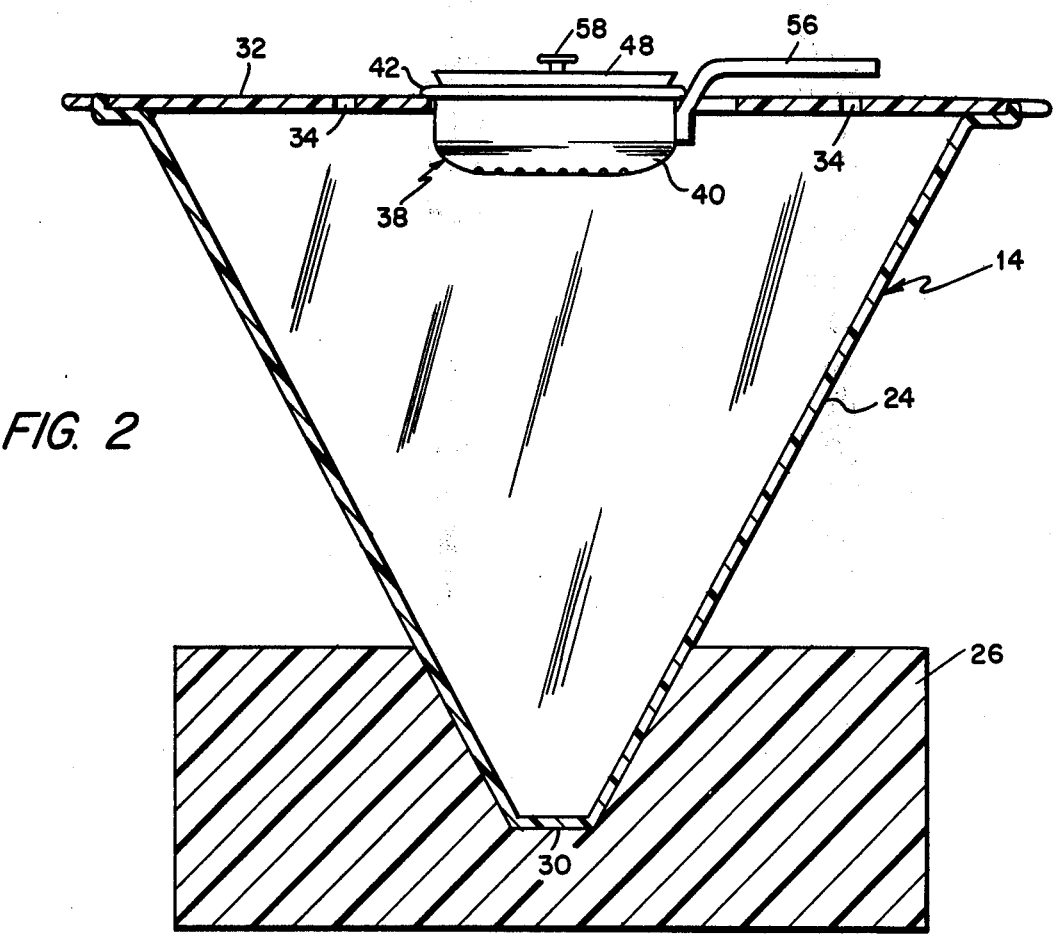
FIG. 2 is an enlarged vertical sectional view through the popcorn maker shown in FIG. 1.

Referring more particularly to FIG. 2, the basic microwave popcorn maker 14 includes a bowl or container 24 which is of a selected shape having a lower region of small internal volume and an upper region of larger internal volume. Such a shape is particularly well exemplified in the conical configuration shown in FIG. 2 wherein the apex of the cone is located at the bottom and the larger end is at the top. Such a conical bowl 24 may be supported by a microwave concentrator 26 of suitable material having a conical depression in its upper surface in which the small end of the bowl 24 is positioned.

In a bowl 24 of the desired shape, the unpopped kernels 28 will necessarily form a closely compacted clump in the bottom of the bowl. When the microwave oven is operated in the normal manner, the microwave energy will enter the oven cavity 12 and will be directed throughout the cavity by multiple reflections off the walls of the oven. Such energy will pass through the walls of the bowl 24 and the microwave transparent support 26 and will cause heating of the kernels, causing them to explode as is well known in the art of making popcorn.

The bowl 24 and supporting member 26 will be made of a material which is transparent to the microwave radiation. Glass is particularly well suited for the invention as are several plastic materials such as styrene, polycarbonate, polysulfone, and polymethylmethacrylate, for example. Ceramic materials, paper and cardboard may also be used if desired. It is important, however, that the bowl 24 and support member 26 have a low dielectric loss at microwave frequencies, thus making them readily transparent to microwaves. However, these elements, particularly the support member 26, may be provided with a slight controlled amount of lossiness if desired, and this may be done by including small amounts of metal or carbon particles in the material from which the member is formed. Such lossiness should not, however, interfere with the efficient transmission of microwaves through the material. It is particularly desired that the bowl remain cool enough to handle after subjection to microwave energy.

The bowl 24 will preferably be conical in shape as shown in FIG. 2 with its side walls being angled at approximately 70°. However, the bowl may be shaped other than conical if desired so long as it has an upper portion of larger volume than the small end portion. The support member 26 is provided with a recess in its upper surface which preferably conforms to the shape of the lower end portion of the bowl 24, and the extreme lower end of the bowl may be slightly flattened, as shown at 30 in FIG. 2.

A microwave-transparent lid 32 is located on the open top of the bowl to prevent undesired escape of popcorn during a popping process. However, it is desirable that steam which is created by the heating of the kernels be allowed to escape. Therefore, the lid 32 is provided with perforations 34 which may be arranged in any desired pattern.

It has been found that microwaves entering the cavity 12 progress directly or by reflection to the clump 28 and cause the kernels in the clump to be heated without causing any substantial heating of the parts of the device. Such heating of the kernels or grains will cause them to expand, puff or, in the case of popcorn, to explode. Such explosion will cause the exploding kernels to move violently upward in the bowl 24. It is believed that kernels near or on the small flat bottom 30 or lying against the inclined walls of the cone may explode before other kernels within the clump. However, in any case, the explosion and resultant violent movement of a kernel will cause a disruption of the kernels within the clump. The popped kernel will fly upwardly, causing some unpopped kernels to also be moved up in the bowl. However, such unpopped kernels will fall back down into the clump because of the steep inclination of the walls and because of their relatively small size. Popped kernels will, because of their relative size, stay above the clump.

Within one of the apertures 35 in the lid 32 is positioned a butter dispenser 38 which may take the form of a small metal container such as a dipper or pot 40 having a diameter enabling it to fit within the aperture. The upper edge of the dipper is slightly outwardly flared or otherwise provided with a circular rim 42 which engages the upper surface of the lid around the aperture whereby the dipper is supported by the lid.

The dipper 40 in one embodiment of the invention, as seen best in FIG. 4, is closed by a cover 44 which comprises a metal disc 46 to which is bonded a plastic ring 48. The ring 48 is sealed to the peripheral edge of the metal disc 46 and preferably forms an extenuation of a plastic film or layer 50 which covers the under side of the disc 46. The metal disc 46 has a diameter which is substantially smaller than the diameter of the opening in the top of the dipper 40. The ring 48, however, is of a size to complete the closure of the dipper, thus providing a complete cover 44 which is partly microwave transparent and partly microwave shielding.

In operation of the device, the metal dipper 40 is partly heated by vapor and gas which rises from the hot popcorn beneath it. The dipper is further heated by direct absorption of microwave radiation. This heating of the dipper 40 causes some melting of a supply 52 of butter or margarine within the dipper. However, this heating is supplemented by heat which is applied directly to the butter 52 by the microwaves which enter the dipper through the microwave-transparent ring 48.

It will be apparent that the relative sizes of the disc 46 and ring 48 may be predetermined so that sufficient microwave heating of the butter may be coupled with heating of the butter via the metal dipper to produce complete melting of the butter at a time when the corn popping cycle is substantially completed. At this point the melted butter will drip through openings 54 in the bottom of the dipper 40 onto the popcorn in the container 24.

A plastic handle 56 is desirably suitably attached at one end to a slide wall of the dipper 40 for convenience in handling. The cover 44 likewise may be provided with a suitable knob 58 or the like for ready removal.

It will be apparent that one such butter dispenser 38 may be mounted in the central aperture 35 in the lid 32, or there may be two or more dispensers in respective apertures if desired.

In FIG. 5 there is shown a device wherein lid 32 has several apertures each containing a respective dispenser 60. Each dispenser 60 comprises a small metal pot 62 having apertures 64 in its bottom. The pot is seated upon the upper limit surface of the lid 32 by a flange 64 thereon and is covered by a metal cover which comprises a metal disc 66 having a large central aperture 68 within which is fitting a removable metal cap 70.

When this device is operated, the metal cap 70 may be left in place or may be removed, depending upon the amount of direct microwave radiation of the butter is desired. For instance, in some cases sufficient heating of the butter to melt it at the proper time is achieved by leaving the cap in place. In other cases, it will be found necessary to remove the cap in order to subject the butter to direct microwave radiation in order to heat and melt it faster. In either event the butter when melted will drip through the openings 64 onto the popcorn below.

In a modification of the FIG. 5 structure, it has been found that the several dispensers 60 may be combined into one larger single annular dispenser if desired, in which case the melted butter will be still more uniformly distributed over the popcorn in the bowl 24.

In a still further embodiment of the invention the butter dispenser may be constructed as shown in FIG. 6 wherein it is shown as a metal container 72 shaped to fit within an aperture 35 in the lid 32 and having a metal cover 74 thereover. The cover 74 has a threaded peripheral flange 76 by which the cover is threaded onto the upper end of the container 72. Since this structure provides substantially complete microwave shielding of the butter 52 within the container, it may be difficult or impossible to heat the butter during a corn popping cycle to the liquidity necessary for the butter to drip through the openings 78 in the bottom of the container.

Therefore, there is provided a manually operable plunger 80 for forcibly ejecting the softened butter through the openings 78. The plunger 80 comprises a disc 82 which extends transversely within the container 72 above the butter 52, and an operating pin 84 which extends vertically through the cover 74 and has one end fixed to the disc 82. The pin 84 is thus enabled to reciprocate longitudinally and is normally held in its outermost position by a coil spring 86 which is disposed between the pin head 88 and the top surface of the cover 74. It will be apparent that when the pin 84 is depressed, the disc 82 will consequently be urged downwardly, forcing the butter out through the openings 78.

It will be apparent that any one of the dispensers shown in the embodiments of FIGS. 4, 5 and 6 may be used either singly or in plural and may be used to automatically dispense butter onto hot popcorn or to be poured thereon subsequent to popping.

It will also be apparent that various modifications and changes in the structures shown and described and in their manner of use and operation may be made by those skilled in the art without departing from the spirit of the invention as expressed in the accompanying claims. Therefore, all matter shown and described is to be interpreted as illustrative and not in a limiting sense.

What is claimed is:

1. A microwave popcorn maker comprising a bowl, a cover extending across the open top of the bowl and having an aperture therein, said bowl and cover being of microwave-transparent material, and a butter dispenser comprising a microwave-impervious container shaped to interfit within said aperture, and a lid for said container, said lid being predominantly impervious to microwave energy and having means for permitting a controlled amount of microwave energy to pass into the interior of the container.

2. A microwave popcorn maker as set forth in claim 1 wherein said lid comprises a metal disc of a diameter smaller than the diameter of the open top of the container, and a ring of microwave-transparent material attached to the periphery of the disc, said ring having an outer diameter such that the lid will close the open top of the container and having a width such that a controlled amount of microwave energy may pass through it into the interior of the container.

3. A microwave popcorn maker as set forth in claim 2 wherein apertures are located in the bottom of the container for exit of melted butter.

4. A microwave popcorn maker as set forth in claim 1 wherein said lid comprises an annular metal member removably connected to the upper end of the container, and a cap mounted in closing relation to the central aperture in said annular member, said cap being removable to permit microwave energy to enter the interior of the container through the central aperture in the annular member.

5. A microwave popcorn maker as set forth in claim 4 wherein apertures are located in the bottom of the container for exit of melted butter.

6. A microwave popcorn maker comprising a bowl, a cover extending across the open top of the bowl and having an aperture therein, said bowl and cover being of microwave-transparent material, and a butter dispenser comprising an open-top microwave-impervious container for holding butter to be melted, a removable lid for said container, said lid being substantially impervious to microwave-energy, apertures in the bottom of said container, and means carried by said lid for ejecting melted butter from the container through said apertures.

7. A microwave popcorn maker as set forth in claim 6 wherein said means comprises a plunger device including a rod-like member extending through said lid, a disc extending transversely within the container and affixed to the adjacent end of said member, and spring means connected to said device for normally retaining the disc in retracted position, said member being manually depressable to move said disc toward the bottom of the container and thereby forcibly urge the butter out of the container through said apertures.

* * * * *